(12) United States Patent
Cranor et al.

(10) Patent No.: US 9,074,131 B2
(45) Date of Patent: Jul. 7, 2015

(54) COMBINED CHEMILUMINESCENT AND FLUORESCENT POWDER MARKING SYSTEM

(71) Applicant: Cyalume Technologies, Inc., West Springfield, MA (US)

(72) Inventors: Earl Cranor, Longmeadow, MA (US); Eric Domingos, Chicopee, MA (US)

(73) Assignee: Cyalume Technologies, Inc., W. Springfield, MA (US)

( * ) Notice: Subject to any disclaimer, the term of this patent is extended or adjusted under 35 U.S.C. 154(b) by 0 days.

(21) Appl. No.: 13/686,294

(22) Filed: Nov. 27, 2012

(65) Prior Publication Data

US 2013/0134356 A1    May 30, 2013

Related U.S. Application Data

(60) Provisional application No. 61/564,299, filed on Nov. 28, 2011.

(51) Int. Cl.
   *C09K 11/07*    (2006.01)
   *C09K 11/06*    (2006.01)

(52) U.S. Cl.
   CPC .............. *C09K 11/07* (2013.01); *C09K 11/06* (2013.01); *C09K 2211/1007* (2013.01)

(58) Field of Classification Search
   USPC ................................ 252/301.16, 700, 301.36
   See application file for complete search history.

(56) References Cited

U.S. PATENT DOCUMENTS

| | | | |
|---|---|---|---|
| 4,379,320 A | 4/1983 | Mohan et al. | |
| 5,705,103 A * | 1/1998 | Chopdekar et al. | 252/700 |
| 6,267,914 B1 | 7/2001 | Cranor | |
| 7,959,835 B2 * | 6/2011 | Cranor et al. | 252/700 |
| 8,104,324 B2 * | 1/2012 | Hennig et al. | 73/12.01 |
| 2005/0224768 A1 | 10/2005 | Park et al. | |
| 2010/0022023 A1 | 1/2010 | Cranor et al. | |
| 2010/0288984 A1 * | 11/2010 | Bindra et al. | 252/700 |
| 2011/0284811 A1 | 11/2011 | Bindra et al. | |

FOREIGN PATENT DOCUMENTS

WO    WO 2010/011761    *    1/2010

OTHER PUBLICATIONS

International Search Report mailed Aug. 21, 2013 for International Application No. PCT/US2012/066616 filed Nov. 27, 2012.

* cited by examiner

*Primary Examiner* — Carol M Koslow
(74) *Attorney, Agent, or Firm* — McHale & Slavin, P.A.

(57)    ABSTRACT

The present disclosure relates to a powder composition comprising both chemiluminescent and fluorescent components. In some embodiments, the disclosure provides a marking system, which is in powder form, comprising at least one oxalate ester, at least one fluorescer, at least one peroxide, at least one catalyst, and at least one secondary fluorescent agent. In accordance with the present disclosure, the at least one oxalate ester, the at least one fluorescer, the at least one peroxide, and the at least one catalyst are admixed at the time of use for the generation of light. In certain embodiments, the chemiluminescent components emit light in the visible, ultraviolet, or infrared spectrum as the result of a chemical reaction, and the secondary fluorescent components can be selected for their ability to absorb at least some of the light generated by the chemiluminescent components, and then reemit light at a different wavelength.

31 Claims, No Drawings

COMBINED CHEMILUMINESCENT AND FLUORESCENT POWDER MARKING SYSTEM

The present application claims priority to U.S. Provisional Patent Application No. 61/564,299, filed Nov. 28, 2011, which is incorporated herein by reference.

The present disclosure relates to a powder composition comprising both chemiluminescent and fluorescent components. The powder composition can be used to produce markers and signals that can be used in a variety of applications, including military and law enforcement training, and in tactical operations.

Markers are used by both military and law-enforcement organizations for training, in tactical operations, and on the battlefield. The markers can be used to visually identify larger-scale targets such as the ground location of enemy equipment and vehicles, as well as smaller-scale targets such as an individual or a specific portion of an individual to indicate where that individual had been hit, for example, by a projectile. In these applications, it is desirable to have the ability to mark a target and have the target stay marked over an extended period of time. Chemiluminescent marking systems can be light sensitive, and may lose the ability to generate light over time.

For these aforementioned applications, it is desirable to have a marking system that generates signals that can be seen in both darkness and in daylight. Therefore, there is a need for such a marking system that may be visible in daylight and/or with thermal and/or night vision devices in darkness.

According to the present disclosure, this can be achieved by employing a marking system, which is in powder form, comprising at least one oxalate ester, at least one fluorescer, at least one peroxide, at least one catalyst, and at least one secondary fluorescent agent. In certain embodiments, it is desirable to formulate a marking system, which is in a granular form, that can be deployed on a surface and which is dispersed in either an activated state, or wherein one part of the chemistry is microencapsulated, such that the pressure of movement occurring upon the surface causes initiation of the light emission.

In accordance with the present disclosure, the at least one oxalate ester, the at least one fluorescer, the at least one peroxide, and the at least one catalyst are admixed at the time of use for the generation of light. Altering at least one of these components through microencapsulation, for example microencapsulating the at least one oxalate ester, serves to delay the generation of light through the chemiluminescent reaction. An application of force would then rupture the microencapsulation around the oxalate ester and result in its interacting with the other active ingredients, initiating the chemiluminescent light generating reaction. This light can be discernable in the IR, UV, and/or visible light wavelengths. The inclusion of the at least one secondary fluorescent agent to the compositions of these embodiments allows the marked target to be visible after the chemiluminescent reaction stops generating appreciable light.

In certain embodiments the chemiluminescent components and the secondary fluorescent components are selected to work in tandem. The chemiluminescent components emit light in the visible, ultra-violet, or infrared spectrum as the result of a chemical reaction. The secondary fluorescent components can be selected for their ability to absorb at least some of the light generated by the chemiluminescent components, and then reemit light at a different wavelength.

Other objects and advantages of this invention will become apparent from the following description.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present disclosure.

The powder marking system of the present disclosure is identifiable in the visible light range and, when activated, by both thermal and/or night vision goggles. "Activation" as used herein means that a chemical reaction between the multiple chemiluminescent components has started. In accordance with the present disclosure, the powder compositions disclosed herein can be provided in any desirable color.

Altering for example the at least one oxalate ester by microencapsulating delays the generation of light upon admixing with the other chemiluminescent components until a force has been applied to the microencapsulation. In other embodiments, at least one of the other components can be microencapsulated. The application of force on the mixture can rupture the microencapsulation and results in the interaction of the released component(s) with the other active ingredients, initiating the chemiluminescent light generating reaction.

Examples of the at least one oxalate useful in the present disclosure include bis(2,4,5-trichloro-6-carbopentoxyphenyl)oxalate; bis(2,4,5-trichlorophenyl)oxalate; bis(2,4,5-tribromo-6-carbohexoxyphenyl)oxalate; bis(2,4,5-trichloro-6-carboisopentoxyphenyl)oxalate; bis(2,4,5-trichloro-6-carbobenzoxyphenyl)oxalate; bis(2-nitrophenyl)oxalate; bis(2,4-dinitrophenyl)oxalate; bis(2,6-dichloro-4-nitrophenyl)oxalate; bis(2,4,6-trichlorophenyl)oxalate; bis(3-trifluoromethyl-4-nitrophenyl)oxalate; bis(2-methyl-4,6-dinitrophenyl)oxalate; bis(1,2-dimethyl-4,6-dinitrophenyl)oxalate; bis(2,4 dichlorophenyl) oxalate; bis(2,5-dinitrophenyl)oxalate; bis(2-formyl-4-nitrophenyl)oxalate; bis(pentachlorophenyl)oxalate; bis(1,2-dihydro-2-oxo-1-pyridyl)glyoxal; bis(2,4-dinitro-6-methylphenyl)oxalate; bis-N-phthalimidyl oxalate; bis(2-nitrophenyl)oxalate; bis(2,4 dinitrophenyl)oxalate; and oxalates represented by the general formula (I)

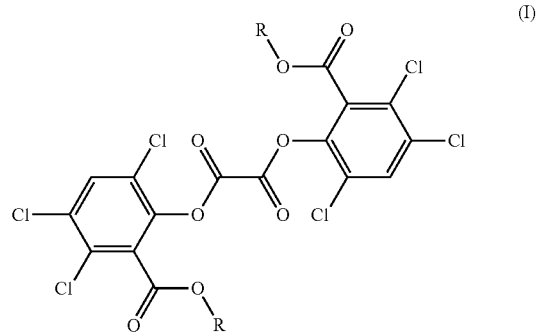

(I)

wherein R=CH$_2$A and A is chosen from alkyl chains, alkyl rings, and aromatic rings or combinations thereof, such that R is nonlinear and such that R comprises from 4-15 carbons, and mixtures of any of the foregoing oxalates.

Non-limiting examples of oxalates represented by formula (I) include:
bis{3,4,6-trichloro-2-[(2-methylpropoxy)carbonyl] phenyl}oxalate;
bis{3,4,6-trichloro-2-[(cyclopropylmethoxy)carbonyl] phenyl}oxalate;
bis{3,4,6-trichloro-2-[(2-methylbutoxy)carbonyl] phenyl}oxalate;
bis{3,4,6-trichloro-2-[(3-methylbutoxy)carbonyl] phenyl}oxalate;

bis{3,4,6-trichloro-2-[(2,2-dimethylpropoxy)carbonyl]
phenyl}oxalate;
bis{3,4,6-trichloro-2-[(2-methylpentyloxy)carbonyl]
phenyl}oxalate;
bis{3,4,6-trichloro-2-[(3-methylpentyloxy)carbonyl]
phenyl}oxalate;
bis{3,4,6-tri chloro-2-[(4-methylpentyloxy)carbonyl]
phenyl}oxalate;
bis{3,4,6-trichloro-2-[(3,3-dimethylbutoxy)carbonyl]
phenyl}oxalate;
bis{3,4,6-trichloro-2-[(2-ethylbutoxy)carbonyl]
phenyl}oxalate;
bis{3,4,6-trichloro-2-[(cyclopentylmethoxy)carbonyl]
phenyl}oxalate;
bis{3,4,6-trichloro-2-[(2-methylhexyloxy)carbonyl]
phenyl}oxalate;
bis{3,4,6-trichloro-2-[(3-methylhexyloxy)carbonyl]
phenyl}oxalate;
bis{3,4,6-trichloro-2-[(4-methylhexyloxy)carbonyl]
phenyl}oxalate;
bis{3,4,6-trichloro-2-[(5-methylhexyloxy)carbonyl]
phenyl}oxalate;
bis{3,4,6-trichloro-2-[(cyclohexylmethoxy)carbonyl]
phenyl}oxalate;
bis{3,4,6-trichloro-2-[(phenylmethoxy)carbonyl]
phenyl}oxalate;
bis{3,4,6-trichloro-2-[(2-phenylethoxy)carbonyl]
phenyl}oxalate;
bis(3,4,6-trichloro-2-{[(2-methylphenyl)methoxy]
carbonyl}phenyl)oxalate;
bis(3,4,6-trichloro-2-{[(3-methylphenyl)methoxy]
carbonyl}phenyl)oxalate;
bis(3,4,6-trichloro-2-{[(4-methylphenyl)methoxy]
carbonyl}phenyl)oxalate;
bis(3,4,6-trichloro-2-{[(2,3-dimethylphenyl)methoxy]
carbonyl}phenyl)oxalate;
bis(3,4,6-trichloro-2-{[(2,4-dimethylphenyl)methoxy]
carbonyl}phenyl)oxalate;
bis(3,4,6-trichloro-2-{[(3,4-dimethylphenyl)methoxy]
carbonyl}phenyl)oxalate;
bis(3,4,6-trichloro-2-{[(3,5-dimethylphenyl)methoxy]
carbonyl}phenyl)oxalate;
bis(3,4,6-trichloro-2-{[(2,6-dimethylphenyl)methoxy]
carbonyl}phenyl)oxalate;
bis(3,4,6-trichloro-2-{[(2-ethylphenyl)methoxy]
carbonyl}phenyl)oxalate;
bis(3,4,6-trichloro-2-{[(3-ethylphenyl)methoxy]
carbonyl}phenyl)oxalate;
bis(3,4,6-trichloro-2-{[(4-ethylphenyl)methoxy]
carbonyl}phenyl)oxalate;
bis(3,4,6-trichloro-2-{[2-(2-methylphenyl)ethoxy]
carbonyl}phenyl)oxalate;
bis(3,4,6-trichloro-2-{[2-(3-methylphenyl)ethoxy]
carbonyl}phenyl)oxalate;
bis(3,4,6-trichloro-2-{[2-(4-methylphenyl)ethoxy]
carbonyl}phenyl)oxalate;
bis{3,4,6-trichloro-2-[(2-phenylpropoxy)carbonyl]
phenyl}oxalate;
bis{3,4,6-trichloro-2-[(3-phenylpropoxy)carbonyl]
phenyl}oxalate;
bis{3,4,6-trichloro-2-[1-naphthalenylmethoxy)carbonyl]
phenyl}oxalate;
bis{3,4,6-trichloro-2-[2-naphthalenylmethoxy)carbonyl]
phenyl}oxalate;
bis{3,4,6-trichloro-2-[(2,2-diphenylethoxy)carbonyl]
phenyl}oxalate;
bis{3,4,6-trichloro-2-[(9-fluorenylmethoxy)carbonyl]
phenyl}oxalate; and
bis{3,4,6-trichloro-2-[(9-anthracenylmethoxy)carbonyl]
phenyl}oxalate.

Additional examples of oxalates represented by general formula (1) are disclosed in U.S. Published Application No. 2011-0084243, the disclosure of such oxalates being incorporated herein by reference.

Examples of the at least one fluorescer useful in the present disclosure include, but are not limited to, 1-methoxy-9,10-bis (phenylethynyl)anthracene; perylene; rubrene; 16,17-didecycloxyviolanthrone; 2-ethyl-9,10-bis(phenylethynyl)anthracene; 2-chloro-9,10-bis(4-ethoxyphenyl)anthracene; 2-chloro-9,10-bis(4methoxyphenyl)anthracene; 9,10-bis (phenylethynyl)anthracene; 1-chloro-9,10-bis(phenylethynyl)anthracene; 1,8-dichloro-9,10-bis(phenylethynyl)anthracene; 1,5-dichloro-9,10-bis(phenylethynyl)anthracene; 2,3-dichloro-9,10-bis(phenylethynyl)anthracene; 5,12-bis (phenylethynyl)tetracene; 9,10-diphenylanthracene; 1,6,7, 12-tetraphenoxy-N,N'-bis(2,6-diisopropylphenyl)-3,4,9,10-perylene dicarboximide; 1,6,7,12-tetraphenoxy-N,N'-bis(2, 5-di-t-butylphenyl)-3,4,9,10-perylene dicarboximide; 1,7-di-chloro-6,12-diphenoxy-N,N'-bis(2,6-diisopropylphenyl)-3,4,9,10-perylene dicarboximide; 1,6,7,12-tetra(p-bromophenoxy)-N,N'-bis(2,6-diisopropylphenyl)-3,4,9,10-perylene dicarboximide; 1,6,7,12-tetraphenoxy-N,N'-dineopentyl-3,4,9,10-perylene dicarboximide; 1,6,7,12-tetra (p-t-butylphenoxy)N,N'-dineopentyl-3,4,9,10-perylene dicarboximide; 1,6,7,12-tetra(o-chlorophenoxy)-N,N'-bis(2, 6-diisopropylphenyl)-3,4,9,10-perylene dicarboximide; 1,6, 7,12-tetra(p-chlorophenoxy)-N,N'-bis(2,6-diisopropylphenyl)-3,4,9,10-perylene dicarboximide; 1,6,7,12-tetra(o-fluorophenoxy)-N,N'-bis(2,6-diisopropylphenyl)-3,4,9,10-perylene dicarboximide; 1,6,7,12-tetra(p-fluorophenoxy)-N, N'bis(2,6-diisopropylphenyl)-3,4,9,10-perylene dicarboximide; 1,6,7,12-tetraphenoxy-N,N'-diethyl-3,4,9, 10-perylene dicarboximide; 1,7-dibromo-6,12-diphenoxy-N,N'-bis(2-isopropylphenyl)-3,4,9,10-perylene dicarboximide; 16,17-dihexyloxyviolanthrone; and 1,4-dimethyl-9,10-bis(phenylethynyl)anthracene.

Catalysts useful in the present invention include, but are not limited to, sodium salicylate; sodium-5-fluorosalicylate; sodium-5-chlorosalicylate; sodium-5-bromosalicylate; sodium trifluoroacetate; potassium salicylate; potassium pentachlorophenolate; lithium salicylate; lithium-3-chlorosalicylate; lithium-5-chlorosalicylate; lithium-3,5-dichlorosalicylate, lithium-3,5,6-trichlorosalicylate; lithium-2-chlorobenzoate; lithium-5-t-butylsalicylate; lithium trifluoroacetate; rubidium acetate; tetrabutylammonium salicylate; tetrabutylammonium tetrafluoborate; tetraethylammonium benzoate; tetrabutylammonium benzoate; tetrabutylammonium hexafluorophosphate; tetraethylammonium perchlorate; tetrabutylammonium perchlorate; tetraoctylammonium perchlorate; tetrabutylammonium-2,3,5-trichlorobenzoate; tetramethylammonium trifluoroacetate; magnesium salicylate; magnesium-5-t-butyl-salicylate; magnesium-3-chlorosalicylate; magnesium-3,5-dichlorosalicylate; and magnesium-3,5,6-trichlorosalicylate.

The amount of the at least one oxalate and the at least one fluorescer employed in the present disclosure is upwardly limited only by the solubility of the ester and fluorescer in the solvent chosen to produce the powder composition. However, as would be appreciated by one in the art, the efficiency of the reaction would decrease at certain high concentrations. In certain embodiments, the at least one oxalate is present in an amount ranging from 3 percent to 60 percent by weight, based on the total weight of the chemiluminescent components in the powder composition. For example, the at least one oxalate can be present in an amount ranging from 3 percent to 50 percent by weight, based on the total weight of the chemiluminescent components in the powder composition, such as from 3 percent to 40 percent by weight, from 3 percent to 30 percent by weight, from 5 percent to 25 percent by weight, and from 7 percent to 25 percent by weight. In certain embodiments, the at least one fluorescer is present in an amount ranging from 0.05 percent to 0.9 percent by weight based on the total weight of the chemiluminescent components in the powder composition. For example, the at least one fluorescer can be present in an amount ranging from greater than 0.05 percent by weight to 0.9 percent by weight, based on the total weight of the chemiluminescent components in the powder composition, such as from greater than 0.1 percent by weight, from greater than 0.2 percent by weight, from greater than 0.3 percent by weight, from greater than 0.4 percent by weight, from greater than 0.5 percent by weight, from greater than 0.6 percent by weight, from greater than 0.7 percent by weight, and from greater than 0.8 percent by weight. In addition, the at least one fluorescer can be present in an amount ranging from 0.05 percent by weight to less than 0.9 percent by weight, based on the total weight of the chemiluminescent components in the powder composition, such as from less than 0.8 percent by weight, from less than 0.7 percent by weight, from less than 0.6 percent by weight, from less than 0.5 percent by weight, from less than 0.4 percent by weight, from less than 0.3 percent by weight, from less than 0.2 percent by weight, and from less than 0.1 percent by weight. It is also intended that the amount of the at least one oxalate and the at least one fluorescer can range between any of the numerical values listed above.

Examples of the at least one peroxide useful in the present disclosure include, but are not limited to, hydrogen peroxide; sodium peroxide; sodium perborate; sodium pyrophosphate peroxide; urea peroxide; histidine peroxide; t-butyl-hydroperoxide; and peroxybenzoic acid, sodium percarbonate, and mixtures thereof. In certain embodiments, the at least one peroxide is present in an amount ranging from 0.25 percent to 25 percent by weight, based on the total weight of the chemiluminescent components in the powder composition. For example, the at least one peroxide can be present in an amount ranging from 0.25 percent to 20 percent by weight, based on the total weight of the chemiluminescent components in the powder composition, such as from 0.5 percent to 20 percent by weight, from 0.5 percent to 15 percent by weight, from 0.5 percent to 10 percent by weight, and from 0.5 percent to 6 percent by weight. In certain embodiments, the at least one peroxide of the present disclosure can be hydrogen peroxide.

Examples of the at least one catalyst useful in the present disclosure include, but are not limited to, sodium salicylate, lithium salicylate, 5-chlorolithium salicylate, triazoles (e.g., 1,2,3-triazole and 1,2,4-triazole), substituted triazoles (e.g., substituted 1,2,3-triazole and substituted 1,2,4-triazole), imidazoles, and substituted imidazoles. In certain embodiments, the at least one catalyst is present in an amount ranging from 0.0005 percent to 0.5 percent by weight, based on the total weight of the chemiluminescent components in the powder composition. For example, the at least one catalyst can be present in an amount ranging from greater than 0.0005 percent by weight to 10 percent by weight, based on the total weight of the chemiluminescent components in the powder composition, such as from 0.001 percent or greater by weight, from 0.005 percent or greater by weight, from 0.01 percent or greater by weight, from 0.05 percent or greater by weight, from 0.1 percent or greater by weight, from 0.25 percent or greater by weight, from 0.5 percent or greater by weight, from 1 percent or greater by weight, from 1.5 percent or greater by weight, from 2 percent or greater by weight, from 2.5 percent or greater by weight, from 3 percent or greater by weight, from 3.5 percent or greater by weight, from 4 percent or greater by weight, from 4.5 percent or greater by weight, from 5 percent or greater by weight, and from 7.5 percent or greater by weight.

Examples of the at least one secondary fluorescent agent useful in the present disclosure include, but are not limited to, UV fluorescent powders, and phosphors. In some embodiments, the at least one secondary fluorescent agent absorbs at least some of the light generated by the chemiluminescent reaction, and then re-emits light. In other embodiments, the at least one secondary fluorescent agent makes only a visible color appearance. In certain embodiments, these fluorescent agents can be produce from dyes such as Brown HT; Quinoline Yellow; Indigo Carmine; Brilliant Blue FCF; Ponceau 4R; Sunset Yellow; Fast Green FCF; and Allura Red AC. In certain embodiments, the at least one secondary fluorescent agent is present in an amount ranging from 1 percent to 55 percent by weight, based on the total weight of the chemiluminescent components in the powder composition. For example, the at least one secondary fluorescent agent can be present in an amount ranging from 1 percent to 40 percent by weight, based on the total weight of the chemiluminescent components in the powder composition. For example, the at least one secondary fluorescent agent can be present in an amount ranging from 1 percent to 40 percent by weight, based on the total weight of the chemiluminescent components in the powder composition, such as from 1 percent to 30 percent by weight, from 1 percent to 20 percent by weight, from 5 percent to 15 percent by weight, from 5 percent to 25 percent, and from 10 percent to 30 percent by weight.

The powder marking system according to the present disclosure can be formed through the use of at least one solvent. Examples of the at least solvent include, but are not limited to, dimethyl phthalate, dibutyl phthalate, dioctal phthalate, butyl benzoate, acetyl triethyl citrate, triethyl citrate, ethylene glycol dibenzoate, and propylene glycol dialkyl ether containing one to three propylene moieties and each alkyl group is independently a straight-chain or branched-chain alkyl group containing up to 8 carbon atoms. Further examples of the at least one solvent include propylene glycol dialkyl ethers containing two propylene moieties such as dipropylene glycol dimethyl ether, dipropylene glycol diethyl ether and dipropylene glycol di-t-butyl ether, dibutyl phthalate, butyl benzoate, propylene glycol dibenzoate, ethyl-hexyl diphenyl phosphate, and mixtures thereof.

The powder marking system according to the present disclosure can be formed through the use of at least one solid substrate. Examples of the at least solid substrate include, but are not limited to, potato starch, arrowroot, rice starch, wheat starch, and combinations or mixtures thereof. In certain embodiments, the at least one solid substrate is present in an amount ranging from 10 percent to 60 percent by weight, based on the total weight of the chemiluminescent components in the powder composition. For example, the at least one solid substrate can be present in an amount ranging from 10 percent to 50 percent by weight, based on the total weight of the chemiluminescent components in the powder composition, such as from 10 percent to 40 percent by weight, from 10 percent to 30 percent by weight, from 10 percent to 20 percent by weight, from 15 percent to 25 percent, from 20 percent to 60 percent, from 30 percent to 60 percent, and from 40 percent to 60 percent by weight.

EXAMPLES

In one illustrative embodiment, the following components were individually made:
  a water solution of 13.4% sodium salicylate and 86.6% water;
  a dye solution with 0.54% rubrene and 99.455% propylene glycol dibenzoate; and an activator solution with 12% 50/50 peroxide and 88% triethyl citrate.

The water solution was mixed with cornstarch at a ratio of 28.63% of water solution to 71.37% cornstarch. The mixture was then dried to a minimum of 9% moisture. The dried mixture was then added to the rubrene dye solution and the activator solution in a ratio of 73.3%/13.3%/13.3%, respectfully. The mixture was further dried, as appropriate, to produce a powder composition that, when combined with at least one oxalate and at least one secondary fluorescent agent, emits light.

Other embodiments of the disclosure will be apparent to those skilled in the art from consideration of the specification and practice of the disclosure herein. It is intended that the specification and examples be considered as exemplary only, with a true scope and spirit of the disclosure being indicated by the following claims.

What is claimed is:

1. A chemiluminescent and fluorescent marking system, which is in powder form, comprising at least one oxalate ester, at least one fluorescer, at least one peroxide, at least one catalyst, and at least one secondary fluorescent agent, wherein said at least one secondary fluorescent agent absorbs at least some of the light generated by the chemiluminescent reaction, and then re-emits light.

2. The chemiluminescent and fluorescent marking system of claim 1, wherein the at least one oxalate ester is chosen from bis(2,4,5-trichloro-6-carbopentoxyphenyl)oxalate, bis(2,4,5-trichlorophenyl)oxalate, bis(2,4,5-tribromo-6-carbobenzoxyphenyl)oxalate, bis(2,4,5-trichloro-6-carboisopentoxyphenyl)oxalate, bis(2,4,5-trichloro-6-carbobenzoxyphenyl)oxalate, bis(2-nitrophenyl)oxalate, bis(2,4-dinitrophenyl)oxalate, bis(2,6-dichloro-4-nitrophenyl)oxalate, bis(2,4,6-trichlorophenyl)oxalate, bis(3-trifluoromethyl-4-nitrophenyl)oxalate, bis(2-methyl-4,6-dinitrophenyl)oxalate, bis(1,2-dimethyl-4,6-dinitrophenyl)oxalate, bis(2,4-dichlorophenyl)oxalate, bis(2,5-dinitrophenyl)oxalate, bis(2-formyl-4-nitrophenyl)oxalate, bis(pentachlorophenyl)oxalate, bis(1,2-dihydro-2-oxo-1-pyridyl)glyoxal, bis(2,4-dinitro-6-methylphenyl)oxalate, bis-N-phthalimidyl oxalate, and oxalates represented by formula (1)

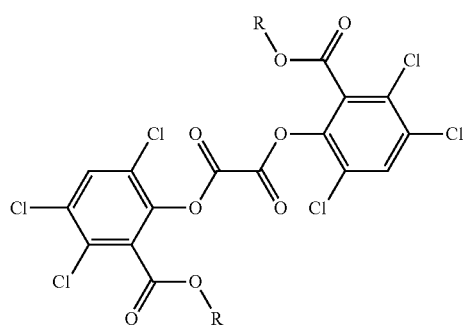

(1)

wherein R=CH$_2$A and A is chosen from alkyl chains, alkyl rings, and aromatic rings or combinations thereof, such that R is nonlinear and such that R comprises from 4-15 carbons, and mixtures of any of the foregoing oxalates.

3. The chemiluminescent and fluorescent marking system of claim 2, wherein the oxalates represented by formula (1) are chosen from bis{3,4,6-trichloro-2-[(2-methylpropoxy)carbonyl]phenyl}oxalate, bis{3,4,6-trichloro-2-[(cyclopropylmethoxy)carbonyl]phenyl}oxalate, bis{3,4,6-trichloro-2-[(2-methylbutoxy)carbonyl]phenyl}oxalate, bis{3,4,6-trichloro-2-[(3-methylbutoxy)carbonyl]phenyl}oxalate, bis{3,4,6-trichloro-2-[(2,2-dimethylpropoxy)carbonyl]phenyl}oxalate, bis{3,4,6-trichloro-2-[(2-methylpentyloxy)carbonyl]phenyl}oxalate, bis{3,4,6-trichloro-2-[(3-methylpentyloxy)carbonyl]phenyl}oxalate, bis{3,4,6-tri chloro-2-[(4-methylpentyloxy)carbonyl]phenyl}oxalate, bis{3,4,6-trichloro-2-[(3,3-dimethylbutoxy)carbonyl]phenyl}oxalate, bis{3,4,6-trichloro-2-[(2-ethylbutoxy)carbonyl]phenyl}oxalate, bis{3,4,6-trichloro-2-[(cyclopentylmethoxy)carbonyl]phenyl}oxalate, bis{3,4,6-trichloro-2-[(2-methyl hexyloxy)carbonyl]phenyl}oxalate, bis{3,4,6-trichloro-2-[(3-methylhexyloxy)carbonyl]phenyl}oxalate, bis{3,4,6-trichloro-2-[(4-methylhexyloxy)carbonyl]phenyl}oxalate, bis{3,4,6-trichloro-2-[(5-methylhexyloxy)carbonyl]phenyl}oxalate, bis{3,4,6-trichloro-2-[(cyclohexylmethoxy)carbonyl]phenyl}oxalate, bis{3,4,6-trichloro-2-[(phenylmethoxy)carbonyl]phenyl}oxalate, bis{3,4,6-trichloro-2-[(2-phenylethoxy)carbonyl]phenyl}oxalate, bis(3,4,6-trichloro-2-{[(2-methylphenyl)methoxy]carbonyl}phenyl)oxalate, bis(3,4,6-trichloro-2-{[(3-methylphenyl)methoxy]carbonyl}phenyl)oxalate, bis(3,4,6-trichloro-2-{[(4-methylphenyl)methoxy]carbonyl}phenyl)oxalate, bis(3,4,6-trichloro-2-{[(2,3-dimethylphenyl)methoxy]carbonyl}phenyl)oxalate, bis(3,4,6-trichloro-2-{[(2,4-dimethylphenyl)methoxy]carbonyl}phenyl) oxalate, bis(3,4,6-trichloro-2-{[3,4-dimethylphenyl)methoxy]carbonyl}phenyl)oxalate, bis(3,4,6-trichloro-2-{[(3,5-dimethylphenyl)methoxy]carbonyl}phenyl)oxalate, bis(3,4,6-trichloro-2-{[(2,6-dimethylphenyl)methoxy]carbonyl}phenyl) oxalate, bis(3,4,6-trichloro-2-{[(2-ethylphenyl)methoxy]carbonyl}phenyl)oxalate, bis(3,4,6-trichloro-2-{[(3-ethylphenyl)methoxy]carbonyl}phenyl) oxalate, bis(3,4,6-trichloro-2-{[(4-ethylphenyl)methoxy]carbonyl}phenyl) oxalate, bis(3,4,6-trichloro-2-{[2-(2-methylphenyl)ethoxy]carbonyl}phenyl)oxalate, bis(3,4,6-trichloro-2-{[2-(3-methylphenyl)ethoxy]carbonyl}phenyl) oxalate, bis(3,4,6-trichloro-2-{[2-(4-methylphenyl)ethoxy]carbonyl}phenyl) oxalate, bis{3,4,6-trichloro-2-[(2-phenylpropoxy)carbonyl]phenyl}oxalate, bis{3,4,6-trichloro-2-[(3-phenylpropoxy)carbonyl]phenyl}oxalate, bis{3,4,6-trichloro-2-[1-naphthalenylmethoxy)carbonyl]phenyl}oxalate, bis{3,4,6-trichloro-2-[2-naphthalenylmethoxy)carbonyl]phenyl}oxalate, bis{3,4,6-trichloro-2-[(2,2-diphenylethoxy)carbonyl]phenyl}oxalate, bis{3,4,6-trichloro-2-[(9-fluorenylmethoxy)carbonyl]phenyl}oxalate, and bis{3,4,6-trichloro-2-[(9-anthracenylmethoxy)carbonyl]phenyl}oxalate.

4. The chemiluminescent and fluorescent marking system of claim 1, wherein the at least one oxalate ester is microencapsulated.

5. The chemiluminescent and fluorescent marking system of claim 1, wherein the at least one oxalate ester is present in an amount ranging from about 3% to about 60% by weight, based on the total weight of the powder.

6. The chemiluminescent and fluorescent marking system of claim 1, wherein the at least one fluorescer is chosen from 1-methoxy-9,10-bis(phenylethynyl)anthracene, perylene, rubrene, 16,17-didecycloxyviolanthrone, 2-ethyl-9,10-bis(phenylethynyl)anthracene, 2-chloro-9,10-bis(4-ethoxyphenyl)anthracene, 2-chloro-9,10-bis(4methoxyphenyl)anthracene, 9,10-bis(phenylethynyl)anthracene, 1-chloro-9,10-bis(phenylethynyl)anthracene, 1,8-dichloro-9,10-bis(phenylethynyl)anthracene, 1,5-dichloro-9,10-bis(phenylethynyl)anthracene, 2,3-dichloro-9,10-bis(phenylethynyl)anthracene, 5,12-bis(phenylethynyl)tetracene, 9,10-diphenylanthracene, 1,6,7,12-tetraphenoxy- N,N'bis(2,6-diisopropylphenyl)-3,4,9,10-perylene dicarboximide, 1,6,7,12-tetraphenoxy-N,N'bis(2,5-di-t-butylphenyl)-3,4,9,10-perylene dicarboximide, 1,7-di-chloro-6,12-diphenoxy-N,N'-bis(2,6-diisopropylphenyl)-3,4,9,10-perylene dicarboximide, 1,6,7,12-tetra(pbromophenoxy)-N,N'-bis(2,6-diisopropylphenyl)-3,4,9,10-perylene dicarboximide, 1,6,7,12-tetraphenoxy-N,N'-di-neopentyl-3,4,9,10-perylene dicarboximide, 1,6,7,12-tetra(p-t-butylphenoxy)N,N'-dineopentyl-3,4,9,10-perylene dicarboximide, 1,6,7,12-tetra(o-chlorophenoxy)-N,N'-bis(2,6-diisopropylphenyl)-3,4,9,10-perylene dicarboximide, 1,6,7,12-tetra(p-chlorophenoxy)-N,N'-bis(2,6-diisopropylphenyl)-3,4,9,10-perylene dicarboximide, 1,6,7,12-tetra(o-fluorophenoxy)-N,N'-bis(2,6-diisopropylphenyl)-3,4,9,10-perylene dicarboximide, 1,6,7,12-tetra(p-fluorophenoxy)N,N'bis(2,6-diisopropylphenyl)-3,4,9,10-perylene dicarboximide, 1,6,7,12-tetraphenoxy-N,N'-diethyl-3,4,9,10-perylene dicarboximide, 1,7-dibromo-6,12-diphenoxy-N,N'-bis(2-isopropylphenyl)-3,4,9,10-perylene dicarboximide, 16,17-dihexyloxyviolanthrone, and 1,4-dimethyl-9,10-bis(phenylethynyl)anthracene.

7. The chemiluminescent and fluorescent marking system of claim 1, wherein the at least one fluorescer is present in an amount ranging from about 0.05% to about 0.9% based on the total weight of the powder.

8. The chemiluminescent and fluorescent marking system of claim 1, wherein the at least one peroxide is chosen from hydrogen peroxide; sodium peroxide; sodium perborate; sodium pyrophosphate peroxide; urea peroxide; histidine peroxide; t-butyl-hydroperoxide; and peroxybenzoic acid, sodium percarbonate, and mixtures thereof.

9. The chemiluminescent and fluorescent marking system according to claim 1, wherein the at least one peroxide is present in an amount ranging from about 0.25% to about 20% based on the total weight of the powder.

10. The chemiluminescent and fluorescent marking system of claim 1, wherein the at least one catalyst is chosen from sodium salicylate, sodium-5-fluorosalicylate, sodium-5-chlorosalicylate, sodium-5-bromosalicylate, sodium trifluoroacetate, potassium salicylate, potassium pentachlorophenolate, lithium salicylate, lithium-3-chlorosalicylate, lithium-5-chlorosalicylate, lithium-3,5-dichlorosalicylate, lithium-3,5,6-trichlorosalicylate, lithium-2-chlorobenzoate, lithium-5-t-butylsalicylate, lithium trifluoroacetate, rubidium acetate, tetrabutylammonium salicylate, tetrabutylammonium tetrafluoborate, tetraethylammonium benzoate, tetrabutylammonium benzoate, tetrabutylammonium hexafluorophosphate, tetraethylammonium perchlorate, tetrabutylammonium perchlorate, tetraoctylammonium perchlorate, tetrabutylammonium-2,3,5-trichlorobenzoate, tetramethylammonium trifluoroacetate, magnesium salicylate, magnesium-5-t-butyl-salicylate, magnesium-3-chlorosalicylate, magnesium-3,5-dichlorosalicylate, and magnesium-3,5,6-trichlorosalicylate.

11. The chemiluminescent and fluorescent marking system of claim 1, wherein the at least one secondary fluorescent agent is chosen from UV fluorescent powders and phosphors.

12. The chemiluminescent and fluorescent marking system of claim 1, wherein the at least one secondary fluorescent agent is present in an amount ranging from about 1% to about 55% based on the total weight of the powder.

13. The chemiluminescent and fluorescent marking system of claim 1, further comprising at least one solid substrate.

14. The chemiluminescent and fluorescent marking system of claim 13, wherein the at least one solid substrate is chosen from potato starch, arrowroot, rice starch, wheat starch, and combinations or mixtures thereof.

15. The chemiluminescent and fluorescent marking system of claim 13, wherein the at least one solid substrate is present in an amount ranging from about 10% to about 60% based on the total weight of the powder.

16. A chemiluminescent and fluorescent marking system, which is in powder form, comprising at least one oxalate ester, at least one fluorescer, at least one peroxide, at least one catalyst, at least one secondary fluorescent agent, and at least one solid substrate, said solid substrate chosen from potato starch, arrowroot, rice starch, wheat starch, and combinations or mixtures thereof.

17. The chemiluminescent and fluorescent marking system of claim 16, wherein the at least one oxalate ester is chosen from bis(2,4,5-trichloro-6-carbopentoxyphenyl) oxalate, bis(2,4,5-trichlorophenyl)oxalate, bis(2,4,5-tribromo-6-carbobenzoxyphenyl)oxalate, bis(2,4,5-trichloro-6-carboisopentoxyphenyl)oxalate, bis(2,4,5-trichloro-6-carbobenzoxyphenyl)oxalate, bis(2-nitrophenyl)oxalate, bis(2,4-dinitrophenyl)oxalate, bis(2,6-dichloro-4-nitrophenyl)oxalate, bis(2,4,6-trichlorophenyl)oxalate, bis(3-trifluoromethyl-4-nitrophenyl)oxalate, bis(2-methyl-4,6-dinitrophenyl)oxalate, bis(1,2-dimethyl-4,6-dinitrophenyl)oxalate, bis(2,4-dichlorophenyl)oxalate, bis(2,5-dinitrophenyl)oxalate, bis(2-formyl-4-nitrophenyl)oxalate, bis(pentachlorophenyl)oxalate, bis(1,2-dihydro-2-oxo-1-pyridyl)glyoxal, bis(2,4-dinitro-6-methylphenyl)oxalate, bis-N-phthalimidyl oxalate, and oxalates represented by formula (1)

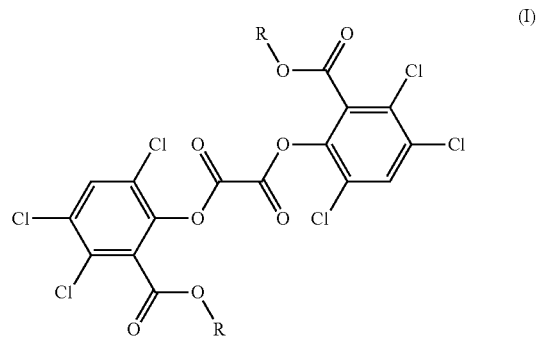

(I)

wherein R=CH2A and A is chosen from alkyl chains, alkyl rings, and aromatic rings or combinations thereof, such that R is nonlinear and such that R comprises from 4-15 carbons, and mixtures of any of the foregoing oxalates.

18. The chemiluminescent and fluorescent marking system of claim 17, wherein the oxalates represented by formula (1) are chosen from bis{3,4,6-trichloro-2-[(2-methylpropoxy)carbonyl]phenyl}oxalate, bis{3,4,6-trichloro-2-[(cyclopropylmethoxy)carbonyl]phenyl}oxalate, bis{3,4,6-trichloro-2-[(2-methylbutoxy)carbonyl]phenyl}oxalate, bis{3,4,6-trichloro-2-[(3-methylbutoxy)carbonyl]phenyl}oxalate, bis{3,4,6-trichloro-2-[(2,2-dimethylpropoxy)carbonyl]phenyl}oxalate, bis{3,4,6-trichloro-2-[(2-methylpentyloxy)carbonyl]phenyl}oxalate, bis{3,4,6-trichloro-2-[(3-methylpentyloxy)carbonyl]phenyl}oxalate, bis{3,4,6-tri chloro-2-[(4-methylpentyloxy)carbonyl]phenyl}oxalate, bis{3,4,6-trichloro-2-[(3,3-dimethylbutoxy)carbonyl]phenyl}oxalate, bis{3,4,6-trichloro-2-[(2-ethylbutoxy)carbonyl]phenyl}oxalate, bis{3,4,6-trichloro-2-[(cyclopentylmethoxy)carbonyl]phenyl}oxalate, bis{3,4,6-trichloro-2-[(2-methyl hexyloxy)carbonyl]phenyl}oxalate, bis{3,4,6-trichloro-2-[(3-methylhexyloxy)carbonyl]phenyl}oxalate, bis{3,4,6-trichloro-2-[(4-methylhexyloxy)carbonyl]

phenyl}oxalate, bis{3,4,6-trichloro-2-[(5-methylhexyloxy) carbonyl]phenyl}oxalate, bis{3,4,6-trichloro-2-[(cyclohexylmethoxy)carbonyl]phenyl}oxalate, bis{3,4,6-trichloro-2-[(phenylmethoxy)carbonyl]phenyl}oxalate, bis{3,4,6-trichloro-2-[(2-phenylethoxy)carbonyl]phenyl}oxalate, bis (3,4,6-trichloro-2-{[(2-methylphenyl)methoxy]carbonyl}phenyl)oxalate, bis(3,4,6-trichloro-2-{[(3-methylphenyl)methoxy]carbonyl}phenyl)oxalate, bis(3,4,6-trichloro-2-{[(4-methylphenyl)methoxy]carbonyl}phenyl)oxalate, bis(3,4,6-trichloro-2-{[(2,3-dimethylphenyl)methoxy]carbonyl}phenyl)oxalate, bis(3,4,6-trichloro-2-{[(2,4-dimethylphenyl)methoxy]carbonyl}phenyl) oxalate, bis(3,4,6-trichloro-2-{[3,4-dimethylphenyl)methoxy]carbonyl}phenyl)oxalate, bis(3,4,6-trichloro-2-{[(3,5-dimethylphenyl)methoxy]carbonyl}phenyl)oxalate, bis(3,4,6-trichloro-2-{[(2,6-dimethylphenyl)methoxy]carbonyl}phenyl) oxalate, bis(3,4,6-trichloro-2-{[(2-ethylphenyl)methoxy]carbonyl}phenyl)oxalate, bis(3,4,6-trichloro-2-{[(3-ethylphenyl)methoxy]carbonyl}phenyl)oxalate, bis(3,4,6-trichloro-2-{[(4-ethylphenyl)methoxy]carbonyl}phenyl) oxalate, bis(3,4,6-trichloro-2-{[2-(2-methylphenyl)ethoxy]carbonyl}phenyl)oxalate, bis(3,4,6-trichloro-2-{[2-(3-methylphenyl)ethoxy]carbonyl}phenyl)oxalate, bis(3,4,6-trichloro-2-{[2-(4-methylphenyl)ethoxy]carbonyl}phenyl) oxalate, bis{3,4,6-trichloro-2-[(2-phenylpropoxy)carbonyl]phenyl}oxalate, bis{3,4,6-trichloro-2-[(3-phenylpropoxy)carbonyl]phenyl}oxalate, bis{3,4,6-trichloro-2-[1-naphthalenylmethoxy)carbonyl]phenyl}oxalate, bis{3,4,6-trichloro-2-[2-naphthalenylmethoxy)carbonyl]phenyl}oxalate, bis{3,4,6-trichloro-2-[(2,2-diphenylethoxy)carbonyl]phenyl}oxalate, bis{3,4,6-trichloro-2-[(9-fluorenylmethoxy)carbonyl]phenyl}oxalate, and bis{3,4,6-trichloro-2-[(9-anthracenylmethoxy)carbonyl]phenyl}oxalate.

19. The chemiluminescent and fluorescent marking system of claim 16, wherein the at least one oxalate ester is microencapsulated.

20. The chemiluminescent and fluorescent marking system of claim 16, wherein the at least one oxalate ester is present in an amount ranging from about 3% to about 60% by weight, based on the total weight of the powder.

21. The chemiluminescent and fluorescent marking system of claim 16, wherein the at least one fluorescer is chosen from 1-methoxy-9,10-bis(phenylethynyl)anthracene, perylene, rubrene, 16,17-didecycloxyviolanthrone, 2-ethyl-9,10-bis(phenylethynyl)anthracene, 2-chloro-9,10-bis(4-ethoxyphenyl)anthracene, 2-chloro-9,10-bis(4methoxyphenyl)anthracene, 9,10-bis(phenylethynyl)anthracene, 1-chloro-9,10-bis(phenylethynyl)anthracene, 1,8-dichloro-9,10-bis(phenylethynyl)anthracene, 1,5-dichloro-9,10-bis(phenylethynyl)anthracene, 2,3-dichloro-9,10-bis(phenylethynyl)anthracene, 5,12-bis(phenylethynyl)tetracene, 9,10-diphenylanthracene, 1,6,7,12-tetraphenoxy-N,N'bis(2,6-diisopropylphenyl)-3,4,9,10-perylene dicarboximide, 1,6,7,12-tetraphenoxy-N,N'bis(2,5-di-t-butylphenyl)-3,4,9,10-perylene dicarboximide, 1,7-di-chloro-6,12-diphenoxy-N,N'-bis(2,6-diisopropylphenyl)-3,4,9,10-perylene dicarboximide, 1,6,7,12-tetra(pbromophenoxy)-N,N'-bis(2,6-diisopropylphenyl)-3,4,9,10-perylene dicarboximide, 1,6,7,12-tetraphenoxy-N,N'-di-neopentyl-3,4,9,10-perylene dicarboximide, 1,6,7,12-tetra(p-t-butylphenoxy)N,N'-dineopentyl-3,4,9,10-perylene dicarboximide, 1,6,7,12-tetra(o-chlorophenoxy)-N,N'-bis(2,6-diisopropylphenyl)-3,4,9,10-perylene dicarboximide, 1,6,7,12-tetra(p-chlorophenoxy)-N,N'-bis(2,6-diisopropylphenyl)-3,4,9,10-perylene dicarboximide, 1,6,7,12-tetra(o-fluorophenoxy)-N,N'-bis(2,6-diisopropylphenyl)-3,4,9,10-perylene dicarboximide, 1,6,7,12-tetra(p-fluorophenoxy)N,N'bis(2,6-diisopropylphenyl)-3,4,9,10-perylene dicarboximide, 1,6,7,12-tetraphenoxy-N,N'-diethyl-3,4,9,10-perylene dicarboximide, 1,7-dibromo-6,12-diphenoxy-N,N'-bis(2-isopropylphenyl)-3,4,9,10-perylene dicarboximide, 16,17-dihexyloxyviolanthrone, and 1,4-dimethyl-9,10-bis(phenylethynyl)anthracene.

22. The chemiluminescent and fluorescent marking system of claim 16, wherein the at least one fluorescer is present in an amount ranging from about 0.05% to about 0.9% based on the total weight of the powder.

23. The chemiluminescent and fluorescent marking system of claim 16, wherein the at least one peroxide is chosen from hydrogen peroxide; sodium peroxide; sodium perborate;
sodium pyrophosphate peroxide; urea peroxide; histidine peroxide;
t-butyl-hydroperoxide; and peroxybenzoic acid, sodium percarbonate, and mixtures thereof.

24. The chemiluminescent and fluorescent marking system according to claim 16, wherein the at least one peroxide is present in an amount ranging from about 0.25% to about 20% based on the total weight of the powder.

25. The chemiluminescent and fluorescent marking system of claim 16, wherein the at least one catalyst is chosen from sodium salicylate, sodium-5-fluorosalicylate, sodium-5-chlorosalicylate, sodium-5-bromosalicylate, sodium trifluoroacetate, potassium salicylate, potassium pentachlorophenolate, lithium salicylate, lithium-3-chlorosalicylate, lithium-5-chlorosalicylate, lithium-3,5-dichlorosalicylate, lithium-3,5,6-trichlorosalicylate, lithium-2-chlorobenzoate, lithium-5-t-butylsalicylate, lithium trifluoroacetate, rubidium acetate, tetrabutylammonium salicylate, tetrabutylammonium tetrafluoborate, tetraethylammonium benzoate, tetrabutylammonium benzoate, tetrabutylammonium hexafluorophosphate, tetraethylammonium perchlorate, tetrabutylammonium perchlorate, tetraoctylammonium perchlorate, tetrabutylammonium-2,3,5-trichlorobenzoate, tetramethylammonium trifluoroacetate, magnesium salicylate, magnesium-5-t-butyl-salicylate, magnesium-3-chlorosalicylate, magnesium-3,5-dichlorosalicylate, and magnesium-3,5,6-trichlorosalicylate.

26. The chemiluminescent and fluorescent marking system of claim 16, wherein the at least one secondary fluorescent agent is chosen from UV fluorescent powders and phosphors.

27. The chemiluminescent and fluorescent marking system of claim 16, wherein the at least one secondary fluorescer absorbs at least some of the light generated by the chemiluminescent reaction, and then re-emits light.

28. The chemiluminescent and fluorescent marking system of claim 16, wherein the at least one secondary fluorescer fluorescent agent makes only a visible color appearance.

29. The chemiluminescent and fluorescent marking system of claim 16, wherein the at least one secondary fluorescent agent is produced from dyes chosen from Brown HT, Quinoline Yellow, Indigo Carmine, Brilliant Blue FCF, Ponceau 4R, Sunset Yellow, Fast Green FCF, and Allura Red AC.

30. The chemiluminescent and fluorescent marking system of claim 16, wherein the at least one secondary fluorescent agent is present in an amount ranging from about 1% to about 55% based on the total weight of the powder.

31. The chemiluminescent and fluorescent marking system of claim 13, wherein the at least one solid substrate is present in an amount ranging from about 10% to about 60% based on the total weight of the powder.

* * * * *